ULTRASONIC TYPE NET WEIGHT LOAD INDICATOR FOR VEHICLES

Original Filed June 10, 1968 2 Sheets-Sheet 1

INVENTOR

Earl C. Nolan

BY Justus Mills

ATTORNEY

ULTRASONIC TYPE NET WEIGHT LOAD INDICATOR FOR VEHICLES

Original Filed June 10, 1968 2 Sheets-Sheet 2

INVENTOR
Earl C. Nolan
BY
ATTORNEY

United States Patent Office

Re. 26,826
Reissued Mar. 17, 1970

26,826

ULTRASONIC TYPE NET WEIGHT LOAD INDICATOR FOR VEHICLES

Earl C. Nolan, 208 Kensington Drive,
Biloxi, Miss. 39530

Original No. 3,428,139, dated Feb. 18, 1969, Ser. No. 735,824, June 10, 1968. Application for reissue Apr. 8, 1969, Ser. No. 824,004
Int. Cl. G01g *19/08, 19/12;* B60p *5/00*
U.S. Cl. 177—137 13 Claims

Matter enclosed in heavy brackets [ ] appears in the original patent but forms no part of this reissue specification; matter printed in italics indicates the additions made by reissue.

ABSTRACT OF THE DISCLOSURE

This invention is a weight load indicator for vehicles and measures the net weight of the load of a vehicle or the weight on each axle, on a meter weight indicator located in the cab of the vehicle. It includes an ultrasonic pulse generator which is operated, when desired, to send a burst of sound through a transceiver to a transducer. The transducer is located on the underside of the vehicle and a sonic reflector is mounted on the vehicle axle, there being springs on the axle supporting the vehicle body. The reflector is in the sonic path of the transducer. A meter, calibrated in weight, is connected to the transceiver, and the meter is thus actuated to reflect the time it takes for the sound to echo back from the sonic reflector to the transducer, which varies in proportion to the compression of the vehicle springs under the weight of the load thereon. One or more trailer vehicles may have their loads indicated in the tractor vehicle cab by having a second transducer and a second sonic reflector similarly mounted on the trailer vehicle underside and axle through a selective switch to the same transceiver and ultrasonic pulse generator, and to the same meter.

OBJECTS OF THE INVENTION

This invention has for an object to provide an improved means for indicating the net weight of the load on a vehicle or the total weight on an axle, as well as on one or more trailer vehicles, if present, the weight indication taking place in the cab of the tractor vehicle. A further object of this invention is to utilize the vehicle springs as the primary measure of the weight of the load, and to measure the compression of the vehicle springs by electronically measuring the varying time it takes for an ultrasonic sound to be echoed between the vehicle underside and sonic reflector mounted on the vehicle axle, and transmitting this time element to a meter calibrated in weight and located in the vehicle cab. If desired, a transducer and sonic reflector may be provided for each axle to indicate each axle load, as well as the net weight load.

BACKGROUND OF THE INVENTION

One of the great problems today is to prevent the overloading of heavy trucks which travel on the highways. There are limits set for each entire truck and for each axle of a truck. This makes it imperative that the operator know during loading of his truck when he is approaching the maximum load limit for the entire vehicle, and the maximum load for each axle. Furthermore, in order to keep maintenance to a minimum, the operator should keep the loads in his truck evenly distributed relative to the wheels thereof.

In connection with trucks and aircraft and other carriers, it is important that they be properly loaded so that they will carry maximum load properly distributed but without overloading the carrier. In particular connection with trucks and such ground vehicles, practically all states have strict laws regulating total load and axle load and such states likewise having weighing stations where trucks passing through the state are required to weigh in. Severe penalties are invoked for overweight trucks and considerable delay is encountered in carrying out the weighing operations.

BRIEF DESCRIPTION OF THE FIGURES

With the above and related objects in view, this invention consists in the details of construction and combination of parts, as will be more fully understood from the following description, when read in conjunction with the accompanying drawing, in which.

DETAILED DESCRIPTION OF THE INVENTION

There is shown at 10, diagrammatically, the cab of a vehicle 12 to which this invention has been applied. In or adjacent the cab 10, there is located an ultrasonic pulse frequency generator 14.

Figure 2:
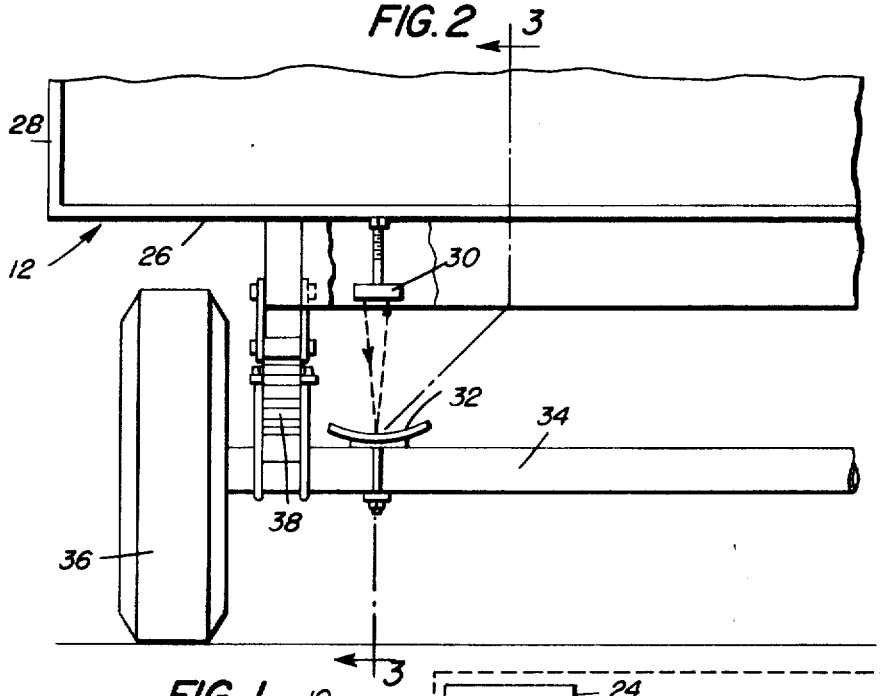
FIG. 2 is a fragmentary showing of the sonic transducer on the underside of a vehicle over a sonic reflector on the axle of the vehicle.
Figure 1:
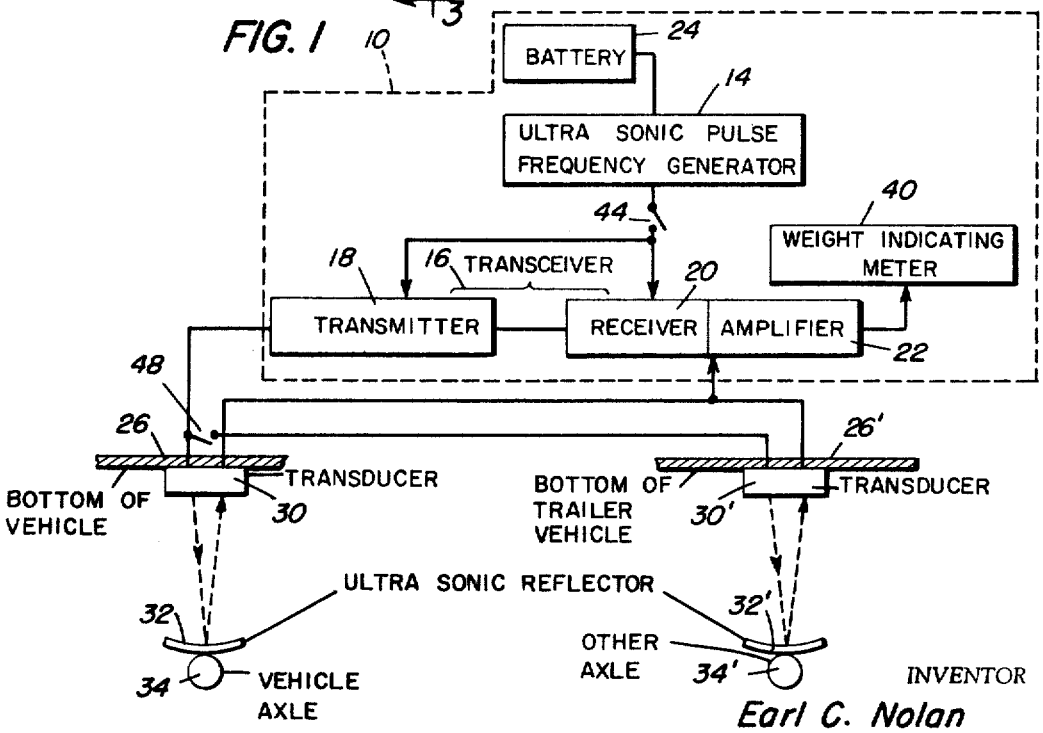
FIG. 1 is a diagrammatic showing of the entire invention.
Figure 3:
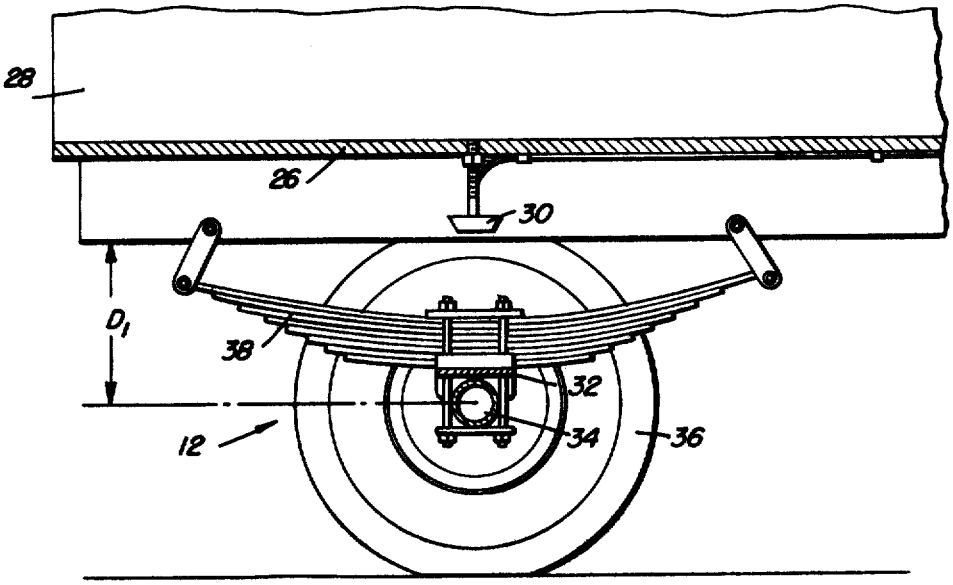
FIG. 3 is a side view of FIG. 2, the vehicle carrying no net load.

The ultrasonic *frequency pulse* [sound] from generator 14 is picked up by a transceiver 16, which includes a transmitter 18, receiver 20 and amplifier 22, all in circuit with a battery 24 which, for convenience, may be the battery of the vehicle 12. Mounted on the underside or bottom 26 of the load body 28 of the vehicle 12 is a transducer 30 in a position directly over a sonic reflector 32. The reflector 32 is mounted on a vehicle axle 34 on which the vehicle wheel 36 is journaled, and the axle 34 is provided with the spring 38 supporting the body 28, the spring compressing in proportion to the load 42 placed on the body 28 between a minimum unloaded position shown in FIG. 3 to a maximum loaded position shown in FIG. 4, thus varying the distance between the transducer 30 and the sonic reflector 32 in proportion to the weight of the load 42.

The transducer 30 is also in circuit through the receiver 20 to meter 40 calibrated to indicate weight and located in the cab 10, a switch 44 being suitably located in the circuit within the cab 10.

OPERATION OF INVENTION

Figure 4:
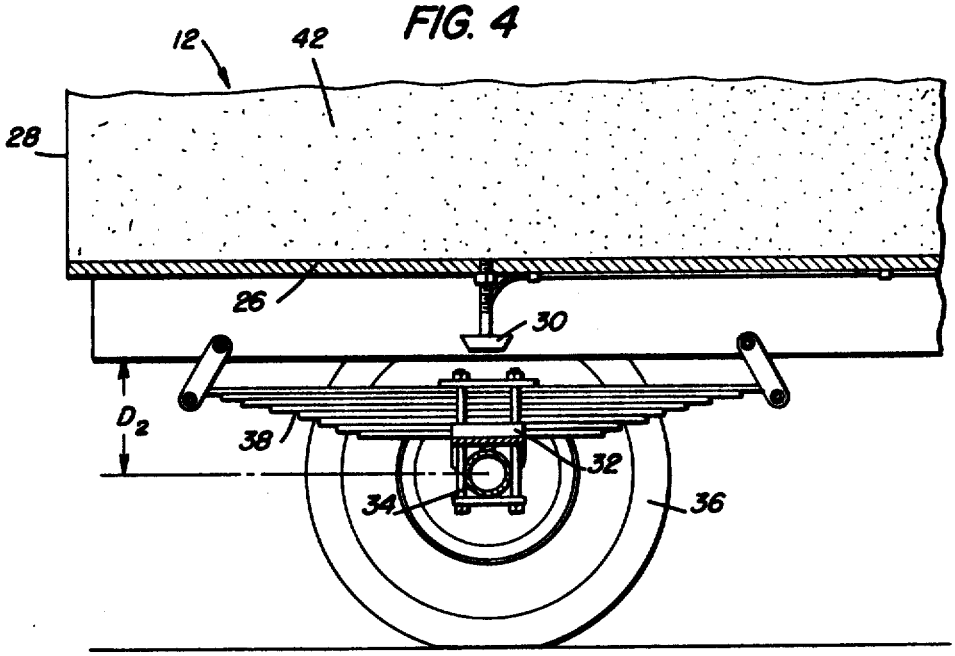
FIG. 4 is a view similar to FIG. 3, with a heavy load on the vehicle.

In operation, if the invention is used only for informing the operator of the net weight of the load, the meter 40 is calibrated to indicate no weight when the vehicle is empty to the maximum weight when the vehicle 12 is fully loaded as in FIG. 4. When this information is desired, as while the vehicle 12 is being loaded, the driver, from time to time, closes the switch 44, sending a burst of ultrasonic pulse, possibly of the nature of 15,000 per minute, from the generator 14 through the circuit of the transmitter 18 to the transducer 30, and the ultrasonic sound goes from the transducer 30 to the reflector 32 and reflects or echoes back to the transducer 30, the time for such echo varying according to the variation in the distance between the body botttom 26 and the axle 34 as determined by the compression of the spring 38, thus being in proportion to the net weight of the load 42. From the receiver 20, the circuit goes to the weight indicating meter 40. The driver thus can read his net weight immediately. If the vehicle 12 has a trailer vehicle 46 attached thereto, such trailer 46 has a second transducer 30' on its bottom 26', with a sonic reflector 32' mounted on the trailer axle 34' and a switch 48 is provided to switch the circuit from the first transducer 30 of the tractor vehicle 12 to the second transducer 30' [on axle 34'] on the trailer vehicle 46.

Potentiometers are provided in the circuit to calibrate the scale of the meter 40 to fit each different loading situation normally encountered. Sensitivity of the meter 40 may be increased by adjusting the amplification 22 to the receiver 20. In addition, this invention may be used for the total weight on each axle 34, not only of the tractor vehicle 12, but also of the trailer vehicle or vehicles 46, by providing a transducer and reflector for each axle 34 and 34' of each vehicle 12 and 46, and a meter 40 or meters 40 suitably calibrated, to indicate the total load on each axle 34 and 34', thus enabling the driver to keep the weight of the axle load, during loading, within the legal limit permitted for each axle 34 and 34'.

ABSTRACT OF THE DRAWING

In the drawings, like numbers refer to like parts, and for the purposes of explication, marshalled below are the numbered parts of the improved net weight load indicator for vehicles:

10—cab of 12
12—vehicle
14—ultrasonic pulse frequency generator
16—transceiver
18—transmitter
20—receiver
22—amplifier
24—battery
26—underside or bottom of 28
26'—underside or bottom of trailer
28—vehicle body
30—transducer
30'—second transducer on 26'
32—sonic reflector
32'—second reflector on 34'
34—axle
34'—second axle
36—wheel
38—spring of 12
40—meter calibrated in weight
42—load
44—switch in circuit to meter 40
46—[tractor] *trailer* vehicle
48—switch to select circuit to either transducer 30 or 30'

Although this invention has been described in considerable detail, such description is intended as being illustrative rather than limiting, since the invention may be variously embodied.

Having thus set forth and disclosed the nature of this invention what is claimed is:

1. In connection with a road vehicle (12) having a body (28), a cab (10), springs (38) for supporting said vehicle body (28) on axles (34) on which wheels (36) are journalled, the improvement comprising an ultrasonic pulse frequency generator (14), an ultrasonic transceiver (16) exposed thereto, a transducer (30) mounted on the underside of the vehicle body (28) over an axle (34) in circuit with said transceiver (16), an ultrasonic reflector (32) mounted on said axle (34) in the sonic path of said transducer (30), a weight indicating meter (40) in circuit with said transceiver (16), and a circuit providing source of electricity (24) connected in circuit with said transceiver (16).

2. The combination of claim 1, said transceiver (16) including a transmitter (18), a receiver (20), and an amplifier (22).

3. The combination of claim 2, said circuit providing source of electricity being the vehicle battery (24).

4. The combination of claim 3, said weight indicating meter (40) being located in the vehicle cab (10).

5. The combination of claim 4, and a trailer vehicle (46) secured to said first vehicle (12), a second transducer (30') in circuit with said transceiver (16) secured to the underside (26') of the trailer vehicle over a trailer axle (34') supporting the trailer body on springs (38), a second ultrasonic reflector (32') mounted on the trailer vehicle axle (34') in the sonic path of said second transducer (30'), and a circuit switch (48) located in said cab (10) of said first vehicle (12) for selectively completing the circuit from said transceiver (16) to either said first transducer (30) or to said second transducer (30').

6. The combination of claim 4, and a second sonic reflector ([32,] 32') mounted on a second axle ([34,] 34'), and a second transducer ([30,] 30') mounted on the vehicle underside ([26,] 26') in the sonic echo path of said second reflector ([32,] 32'), and a switch (48) for connecting said second transducer ([30,] 30') in place of said first transducer (30) in circuit to indicate the weight on the second axle ([34,] 34').

7. The combination of claim 6, said second axle *(34')* [(34)] being a second axle (34') on [the] same vehicle (12) to thus indicate axle loading.

8. The combination of claim 6, said second axle (34') being *an* [a second] axle (34') on [the] *a* trailer vehicle (46) to thus indicate the load on said axle (34') of the *trailer* [tractor] vehicle (46).

*9. A system for measuring the weight of a load comprising,*

*(a) a support for the load,*

*(b) spring means interposed between the support and a base and yieldable under load,*

*(c) means for initiating bursts of compressional wave energy at one end of a path and receiving the energy at the termination of the path,*

*(d) said path including the distance extending between a fixed station on the support and a fixed station on the base,*

*(e) and means for measuring the elapsed time of travel of the energy between the ends of the path for indicating the weight of the load.*

*10. The system of claim 9, wherein the means for receiving the energy at the termination of the path is located at one of the stations.*

*11. The system of claim 9, wherein the means for initiating bursts of compressional wave energy includes a generator of compressional wave energy of an ultrasonic frequency located at one of the fixed stations.*

*12. The system of claim 9, wherein the support for the load is the body of a wheeled vehicle and the base is an axle having wheels journaled thereon.*

*13. The system of claim 12, wherein the means for directing bursts of energy includes a generator of compressional waves at an ultrasonic frequency mounted at one of said stations.*

References Cited

The following references, cited by the Examiner, are of record in the patented file of this patent or the original patent.

UNITED STATES PATENTS

| | | | |
|---|---|---|---|
| 2,923,540 | 2/1960 | Yost et al. | 177—137 |
| 2,933,302 | 4/1960 | Cordell | 177—137 |
| 2,943,296 | 6/1960 | Fryklund | 340—1 |

ROBERT S. WARD, JR., Primary Examiner

U.S. Cl. X.R.

177—210; 340—1